Figure 1:
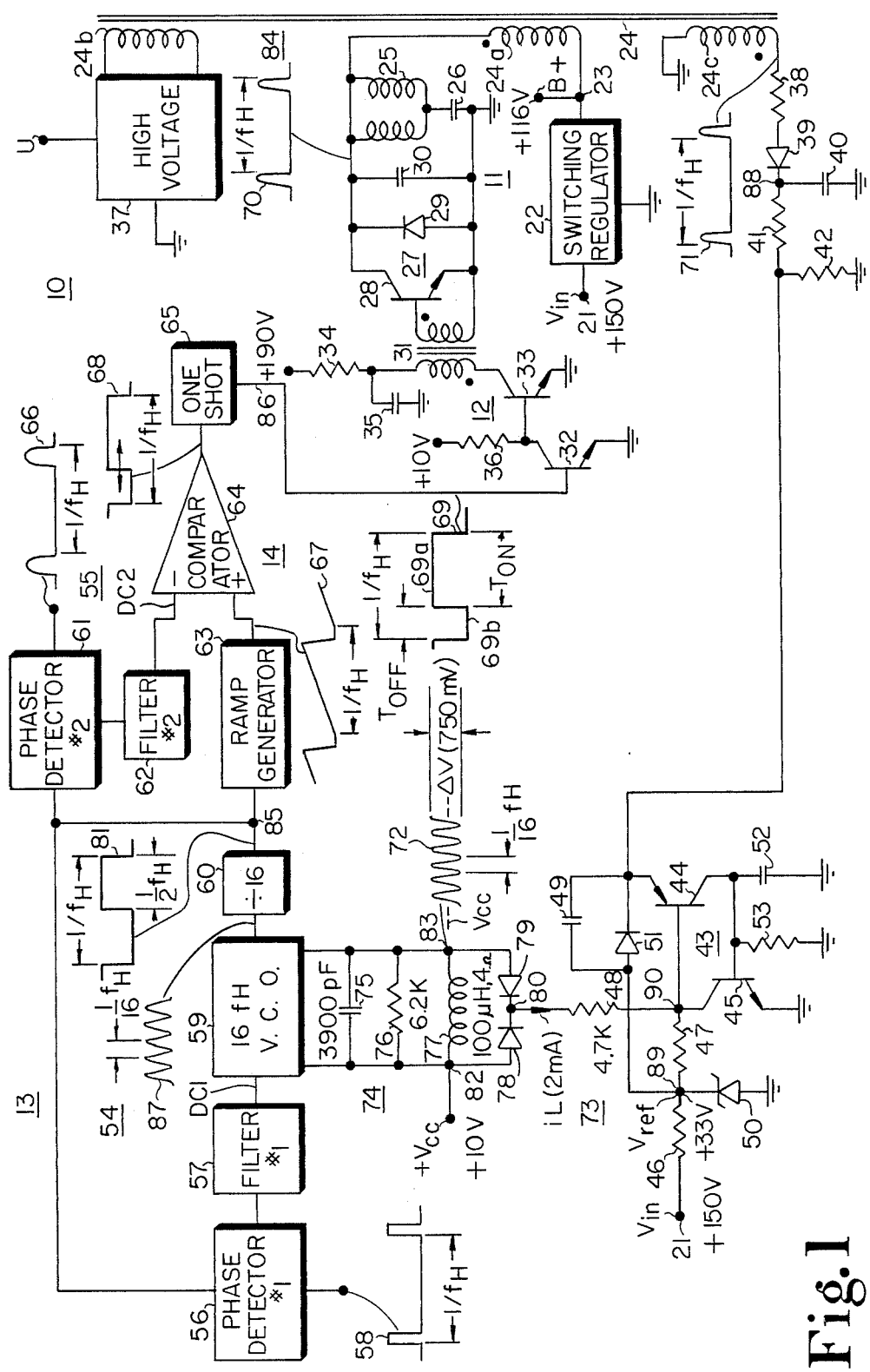

United States Patent [19]

Balaban et al.

[11] 4,389,676
[45] Jun. 21, 1983

[54] TELEVISION RECEIVER HIGH VOLTAGE PROTECTION CIRCUIT

[75] Inventors: Alvin R. Balaban, Lebanon; Steven A. Steckler, Clark, both of N.J.; Ronald E. Fernsler, Indianapolis, Ind.

[73] Assignee: RCA Corporation, New York, N.Y.

[21] Appl. No.: 216,338

[22] Filed: Dec. 15, 1980

[51] Int. Cl.³ ............................................. H04N 5/68
[52] U.S. Cl. ..................................... 358/243; 358/74; 315/411; 331/167
[58] Field of Search ................. 358/74, 243; 315/411; 331/62, 167, 183

[56] References Cited

U.S. PATENT DOCUMENTS

| | | | |
|---|---|---|---|
| 3,813,580 | 5/1974 | Norman | 317/23 |
| 3,840,784 | 10/1974 | Schauffele | 358/243 |
| 4,042,859 | 8/1977 | Kashiwagi | 358/243 |
| 4,045,742 | 8/1977 | Meehan et al. | 328/9 |
| 4,082,986 | 4/1978 | Gamboa | 315/411 |
| 4,241,296 | 12/1980 | Barter | 315/397 |
| 4,263,615 | 4/1981 | Steinmetz et al. | 358/148 |

OTHER PUBLICATIONS

"The CTC-85 Color Chassis Technical Manual", Prepared by RCA Corporation, Indianapolis, Indiana, Copyright 1977.

*Primary Examiner*—Richard Murray
*Attorney, Agent, or Firm*—E. M. Whitacre; P. J. Rasmussen; Joseph Laks

[57] ABSTRACT

In a television receiver horizontal deflection circuit, the deflection circuit oscillator includes an LC resonant tank network that is excited into sustained oscillation to develop an oscillator alternating output signal. A high voltage generator is responsive to the oscillator output signal and develops a picture tube ultor voltage at an ultor terminal. An ultor voltage representative signal is applied to the input of a disabling latch circuit of a television receiver high voltage protection circuit. First and second diodes are coupled across the inductive portion of the oscillator tank network, with the cathodes of the two diodes being coupled together at a junction in common with the output terminal of the disabling latch. If the ultor voltage exceeds a predetermined level, the latch is energized, forward biasing both diodes to provide a short-circuit across the tank network. Sustained oscillation of the tank network is stopped and the oscillator alternating output signal is removed to disable operation of the high voltage generator.

19 Claims, 2 Drawing Figures

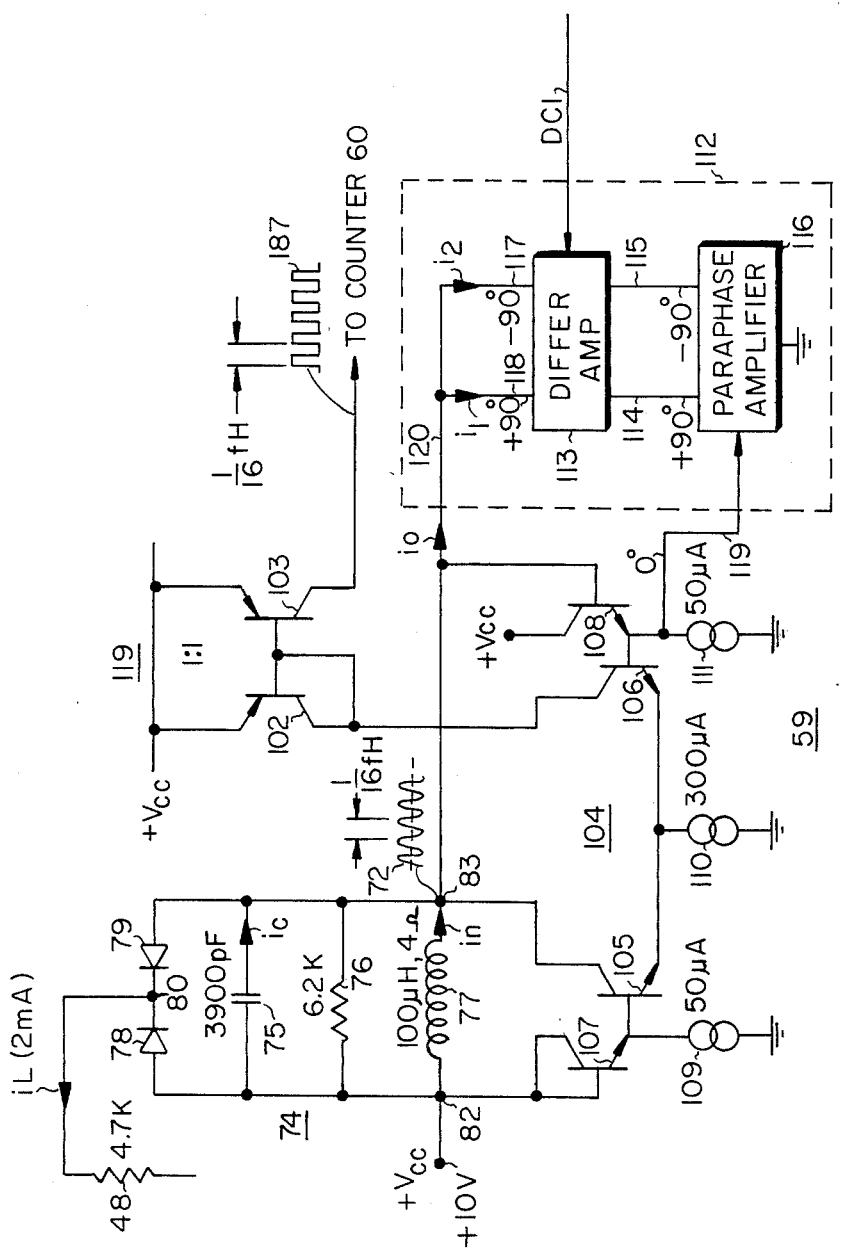

TELEVISION RECEIVER HIGH VOLTAGE PROTECTION CIRCUIT

This invention relates to LC oscilllator shutdown circuits and to high voltage protection circuits for television displays.

In a typical television display system, a DC ultor voltage is applied to the final anode electrode of a picture tube to accelerate onto a phosphor screen the electron beams generated at the picture tube cathode. When the electron beams impinge on the phosphor particles of the phosphor screen, the particles emit radiation in the visible region. The amount of emitted visible radiation is a function of the magnitude of the ultor voltage. The greater the ultor voltage, the greater the phosphor emission at a given input signal level to the cathode. Relatively large ultor voltages are desirable in order to impart a relatively high brightness to the scenes displayed on the picture tube phosphor screen. In a television receiver with a shadow mask type picture tube, ultor voltages of 30 kilovolts or more may be generated.

Because the electron beams of a color picture tube are accelerated to a relatively high velocity before they impinge on the shadow mask and phosphor screen, a certain amount of X-radiation emission accompanies the emission of visible radiation by the phosphor particles. Almost all the emitted X-radiation is absorbed by the picture tube glass envelope, faceplate, and adjacent metallic structures, such as the magnetic shield. Under normal ultor voltage and beam current operating conditions, the amount of X-radiation not absorbed is maintained at an extremely low level, quite insufficient to be harmful to any observer or bystander.

The high voltage generator that develops the ultor voltage may be incorporated as part of the horizontal deflection circuit of the television receiver. A horizontal oscillator provides horizontal rate signals to a driver transistor to switch the transistor on and off at a horizontal rate. The primary winding of a driver transformer is coupled to the output electrode of the horizontal driver transistor and the secondary winding is coupled to the base of a horizontal output transistor. When the driver transistor is turned on, a negative voltage is developed across the driver transformer secondary winding to reverse bias the horizontal output transistor. During the on-time of the driver transistor, energy is being stored in the driver transformer magnetic field. When the driver transistor is turned off, a positive voltage is developed across the driver transformer secondary winding to forward bias the horizontal output transistor. The stored energy of the driver transformer is used to generate the forward base current in the horizontal output transistor.

After the horizontal output transistor becomes cut off, the horizontal deflection winding and the retrace capacitor form a resonant retrace circuit to develop a retrace pulse voltage that is applied to the primary winding of a flyback transformer. The retrace pulse voltage applied across the flyback transformer primary winding is stepped up and rectified by a flyback transformer and rectifier arrangement to develop the DC ultor voltage for the picture tube.

To insure that the television receiver will not be operated under fault conditions at excessive emission levels of X-radiation, a high voltage protection circuit may be provided that disables the high voltage generator should the ultor voltage approach unacceptable levels. An ultor voltage representative signal is applied to the input of a disabling latch circuit. In the prior art circuitry, the output terminal of the latch, out of which terminal the main latch current flows, is coupled to the base of the horizontal driver transistor.

If the ultor voltage exceeds a predetermined level, the disabling latch is energized and the latch current flows out of the latch output terminal into the base of the horizontal driver transistor. The latch provides sufficient base current to maintain the horizontal driver transistor continuously conducting as long as the latch is energized.

After the latch is energized, the horizontal driver transistor can no longer provide the switching action needed to switch the horizontal output transistor on and off each deflection cycle. With the horizontal driver transistor in continuous conduction, no forward biasing voltage for the horizontal output transistor can be developed across the secondary winding of the driver transformer. The horizontal output transistor is continuously maintained in the off-state, preventing the development of any retrace pulse voltages. The high voltage generator is therefore disabled and the ultor voltage ceases to be developed.

The above-described prior art high voltage protection circuit has the relative disadvantage in that a relatively large latch current must be provided to insure a continuous supply of forward base current into the horizontal driver transistor even when switching signals are still being developed at the output terminal of the horizontal oscillator. The disabling latch must supply enough current so that even when some of the current is periodically diverted away from the driver transistor base to the horizontal oscillator output terminal, a sufficient amount of current still flows into the base of horizontal driver transistor to maintain it continuously conducting.

A current limiting series resistance may be coupled between the horizontal oscillator output terminal and the base of the horizontal driver transistor to prevent the diversion of too much latch current from the base of the driver transistor. However, because a speed-up capacitor may also be placed between the oscillator output terminal and the base of the driver transistor to speed up normal turn-off of the driver transistor, the added series resistance, above mentioned, may degrade normal circuit performance by providing improper drive to the driver transistor.

A feature of the invention is to provide a high voltage protection circuit which does not have the above-described disadvantages. In accordance with one aspect of the invention, an LC oscillator may be part of an oscillator stage used in conjunction with the horizontal deflection circuit. A shutdown circuit is then provided to stop LC oscillator operation. The oscillator stage output voltage is normally established by the resonant oscillation of an LC network within the oscillator. A switch in the shutdown circuit is coupled to the LC resonant circuit and is activated by a shutdown signal to AC short-circuit the inductive portion of the resonant circuit. With the LC resonant circuit short-circuited, oscillator operation is stopped. Since the LC oscillator output is used to generate the switching signals for the horizontal output transistor, once the LC oscillator is stopped, high voltage generation ceases.

In a specific embodiment of the invention, the switching arrangement to AC short-circuit the LC resonant network comprises first and second diodes coupled across the inductive portion of the resonant network, with the like functioning electrodes of the diodes being coupled together at a junction. A disabling latch has its output coupled to the junction of the two diodes and when energized by the shutdown signal forward biases the diodes into conduction, thereby resulting in the short-circuiting of the resonant network.

The disabling latch may be energized at any instant within a horizontal deflection cycle. In the prior art circuitry, if the latch is energized during the interval that reverse biasing voltage is applied to the horizontal output transistor, energization of the latch merely maintains the output transistor in the off-state by supplying latch current to the base of the driver transistor, keeping the transistor conducting even after the horizontal oscillator output signal attempts to turn off the driver transistor. If the latch is energized during the forward or on-drive interval of the horizontal output transistor, the on-drive interval is abruptly terminated when the latch turns on the driver transistor. Thereafter, the output transistor is continuously maintained in the off-state.

It may be desirable to design a deflection circuit having a high voltage shutdown arrangement that permits the completion of the horizontal output transistor on-drive interval, rather than abruptly terminating it, if the shutdown circuit is activated within that interval. By insuring that the horizontal output transistor on-drive interval is not prematurely terminated, the possibility of undue output transistor stress during shutdown is lessened. After completion of the on-drive interval, the shutdown circuit continuously maintains the horizontal output transistor in the off-state until the shutdown circuit is deenergized, as by turning off the television receiver.

In accordance with one aspect of the invention, a one-shot pulse generator is interposed between the output terminal of the horizontal oscillator stage and the base drive circuit for the output transistor. The output signal from the horizontal oscillator stage enables the one-shot to turn on the horizontal output transistor at the appropriate instant within each horizontal deflection cycle. The enabled output of the one-shot is then applied to the base of the horizontal output transistor to turn the transistor on and maintain it on for the duration of the one-shot pulse. Since the pulse ouput of the one-shot is not affected by subsequent signal changes at the one-shot input until completion of the pulse, activation of the shutdown circuit during the enablement of the one-shot cannot prematurely terminate the on-drive to the horizontal output transistor.

FIG. 1 illustrates a horizontal deflection circuit with a high voltage protection circuit embodying the invention; and FIG. 2 illustrates a portion of the circuit of FIG. 1 including a specific embodiment of the voltage controlled oscillator of FIG. 1.

In a television receiver horizontal deflection circuit 10, illustrated in FIG. 1, an unregulated DC input voltage Vin, developed at a terminal 21, is applied to a conventional switching regulator 22 to develop a regulated B+ supply voltage for the horizontal scanning circuit at a terminal 23. Terminal 23 is coupled to a horizontal output stage 11 through the primary winding 24a of a flyback transformer 24.

Horizontal output stage 11 comprises the series arrangement of a horizontal deflection winding 25 and an S-shaping capacitor 26, a trace switch 27 comprising a horizontal output transistor 28 and a damper diode 29, and a retrace capacitor 30. Horizontal scanning current is generated in horizontal deflection winding 25 in response to the switching action of trace switch 27. The conduction of horizontal output transistor 28 is controlled by a horizontal rate, $f_H$, switching signal 69 that is developed on a conductor line 86 and that is applied to the base of the horizontal output transistor by way of a horizontal driver stage 12.

Horizontal driver stage 12 comprises an inverting transistor 32, a horizontal driver transistor 33, and a driver transformer 31. Supply voltage for the collector of inverting transistor 32 and the base of horizontal driver transistor 33 is obtained through a resistor 36. Supply voltage for the collector of horizontal driver transistor 33 is obtained through the series connection of a resistor 34 and the primary winding of transformer 31. A waveshaping capacitor 35 is coupled to the junction of resistor 34 and the primary winding of driver transfomer 31.

Beginning at the leading or positive-going edge of the horizontal rate switching signal 69, a positive, forward biasing voltage is developed across the secondary winding of driver transformer 31 and applied to the base of horizontal output transistor 28. Horizontal output transistor 28 begins conducting forward collector current after damper diode 29 becomes cut off sometime prior to the center of the horizontal trace interval.

Beginning at the trailing edge or negative-going transition of the horizontal rate switching signal 69, a negative, reverse biasing voltage is applied to the base of horizontal output transistor 28. After a turn-off delay interval, horizontal output transistor 28 becomes cut off to initiate a horizontal retrace interval. Retrace capacitor 30 and deflection winding 25 form a resonant retrace circuit to develop a horizontal retrace pulse voltage across the deflection winding, as indicated in FIG. 1 by the retrace pulse voltage 70 appearing at the collector of horizontal output transistor 28.

A high voltage generator 84 comprises horizontal output stage 11, primary winding 24a and a high voltage 24b of flyback transformer 24, and a high voltage circuit 37. High voltage generator 84 utilizes the retrace pulse voltage applied to primary winding 24a to generate a DC ultor voltage at a terminal U for a television receiver picture tube, not illustrated.

Horizontal deflection circuit 10 includes a horizontally synchronized horizontal oscillator stage 13 that develops a horizontal rate oscillator signal 81 at a horizontal oscillator output terminal 85. Horizontal oscillator signal 81 is then applied to a scan synchronized horizontal drive generator 14 to develop the horizontal rate, square-wave or bilevel switching signal 69 on conductor line 86.

Horizontal oscillator 13 includes a voltage controlled oscillator, VCO 59, that developes an alternating oscillator output signal 87. The frequency of oscillator output signal 87 is determined by the resonant frequency of an inductive-capacitive, LC resonant tank network 74 coupled across input terminals 82 and 83. Input terminal 82 is also coupled to a source of DC supply voltage Vcc that is used to energize the circuitry of VCO 59. LC resonant tank network 74 comprises the parallel arrangement of an inductor 77, a capacitor 75, and a resistor 76. The resistance of resistor 76 controls the Q of tank network 74 and aids in establishing the frequency range over which VCO 59 may be controlled. Resistor 76 also substantially determines the peak-to-peak voltage across tank network 74 to provide frequency stability of operation.

VCO 59 excites resonant tank network 74 into sustained, regenerative oscillation to develop an alternating polarity voltage across input terminals 82 and 83, across inductor 77, as illustrated in FIG. 1 by the alternating voltage 72 developed at input terminal 83. The peak-to-peak voltage excursion, $\Delta V$, of voltage 72 is small relative to the DC supply voltage. VCO 59 amplifies and waveshapes the input voltage waveform to produce alternating output signal 87. The resonant frequency of tank network 74, and thus the frequency of alternating output signal 87, may be selected as a multiple of the horizontal deflection frequency, illustratively $16f_H$ in FIG. 1.

The $16f_H$ output signal 87 is applied to the clock input terminal of a conventional counter 60 configured as a divide-by-sixteen divider. The output terminal of counter 60 is in the horizontal oscillator stage output terminal 85. The output signal of counter 60 is thus the horizontal rate, oscillator signal 81 that is applied to drive generator 14.

By means of a phase locked loop circuit 54, horizontal oscillator signal 81 is synchronized with a horizontal sync pulse 58 developed at a terminal 88 by a sync separator circuit, not illustrated. Phase locked loop 54 may be conventionally designed or may be designed similar to that described in U.S. Patent Application Ser. No. 129,841, filed Mar. 13, 1980, entitled "DUAL PHASE CONTROL LOOP HORIZONTAL DEFLECTION SYNCHRONIZING CIRCUIT", by A. R. Balaban and S. A. Steckler, now U.S. Pat. No. 4,327,376, herein incorporated by reference.

A phase detector 56 compares the frequency and phase of horizontal oscillator signal 81 relative to that of horizontal synchronizing pulse 58. The output of phase detector 56 is applied to a filter 57 to produce a substantially direct current filter output voltage, DC1, that is representative of the frequency and phase difference of horizontal oscillator signal 81 relative to sync pulse 58. The control voltage DC1 is applied to VCO 59 to adjust the frequency and phase of the VCO so as to synchronize horizontal oscillator signal 81 with the incoming horizontal synchronizing pulse 58.

Synchronized horizontal oscillator signal 81, developed at terminal 85, is applied as a reset to a ramp generator 63 of horizontal drive generator 14 to develop a horizontal rate ramp or sawtooth voltage 67 that is also synchronized with horizontal sync pulse 58. Horizontal sawtooth voltage 67 is applied to the positive input terminal of a comparator 64. A substantially direct current control voltage DC2 is applied to the negative input terminal of comparator 64. The leading edge or positive-going transition of the output voltage 68 of comparator 64 occurs when the positive-going portion of sawtooth voltage 67 exceeds the control voltage DC2. The occurrence of the leading edge of voltage 68 will vary with variations in the control voltage DC2. The output of comparator 64 is, therefore, a horizontal rate, bilevel voltage 68 that has its duty cycle determined by the value of the control voltage DC2.

The comparator output voltage 68 is applied to a one-shot or monostable multivibrator 65. One-shot 65 is responsive to only one of the positive and negative-going transitions of bilevel voltage 68. The positive-going edge of voltage 68, for example, triggers one-shot 65 to produce on conductor line 86 a drive pulse voltage corresponding to the upper level portion 69a of bilevel horizontal rate switching signal 69. After being triggered, one-shot 65 remains in the upper level state for a fixed duration interval, $T_{on}$, that is independent of the recurrence of a positive-going transistion during this interval.

After elapse of the $T_{on}$ interval, one-shot 65 reverts to the lower level state until the one-shot is again triggered by the leading edge of the comparator output voltage 68. Horizontal rate switching voltage 69 thus comprises a voltage having an upper level portion 69a of fixed duration $T_{on}$ and a leading edge coincident with the leading edge of comparator output voltage 68. The remaining lower level portion 69b of switching voltage 69 is of duration $T_{off}=1/f_H-T_{on}$. One-shot 65 may be of conventional design or similar to that described in U.S. Patent Application Ser. No. 102,575, filed Dec. 11, 1979, entitled "PULSE GENERATOR FOR A HORIZONTAL DEFLECTION SYSTEM", by A. R. Balaban and S. A. Steckler, now U.S. Pat. No. 4,282,529, herein incorporated by reference.

The drive pulse voltage interval $T_{on}$ of switching signal 69 represents the on-drive interval within each horizontal deflection cycle during which a forward biasing voltage for horizontal output transistor 28 is developed across the secondary winding of driver transformer 31. During the interval $T_{on}$, inverting transistor 32 of driver stage 12 is in the on-state and driver transistor 33 is in the off-state. Energy that was stored in the primary winding of driver transformer 31 when driver transistor 33 was previously conducting during the off-drive interval, $T_{off}$, now flows out of the driver transformer secondary winding during the on-drive interval to develop forward base current in horizontal output transistor 28.

To initiate the horizontal retrace interval, driver transistor 33 is turned on by the trailing or negative-going edge of switching waveform 69, thereby developing across the secondary winding of driver transformer 31 a negative or reverse biasing voltage for horizontal output transistor 28. Horizontal output transistor 28 does not immediately turn off upon the occurrence of the trailing edge of waveform 69, but becomes cut off after a turn-off delay interval that encompasses the storage time delay interval of horizontal output transistor 28. During the storage time delay interval, the stored base charge of the horizontal output transistor is swept out of the transistor base region. After elapse of the turn-off delay interval, horizontal output transistor 28 becomes cut off and remains cut off until the leading edge of switching waveform 69 reoccurs to develop across the secondary winding of driver transformer 31 the output transistor forward biasing voltage.

The collector current of horizontal output transistor 28 varies with variations in beam current loading of high voltage generator 84, increased loading, for example, resulting in increased horizontal output transistor collector current. Variations in horizontal output transistor collector current produce variations in the duration of the turn-off delay interval since the storage time of the horizontal output transistor is a function of its collector current magnitude. Beam current loading variations will thus produce variations in the initiation of horizontal retrace relative to the occurrence of the trailing edge of switching waveform 69.

To maintain synchronization of horizontal scanning with the picture information of the television receiver composite video signals, the leading edge of the modulated square-wave signal 68, developed by comparator 64, is varied by a phase control loop 55. Phase control loop 55 varies the DC control voltage DC2 applied to comparator 64 so as to maintain the horizontal retrace interval in a fixed phase relation with respect to the horizontal blanking interval of the composite video signals. Phase control loop 55 may be of conventional design, or may be similar to that described in U.S. Patent Application Ser. No. 105,503, filed Dec. 20, 1979, entitled "DELAY GENERATOR" by S. A. Steckler and A. R. Balaban, now U.S. Pat. No. 4,292,654, or may be similar to that described in U.S. Patent Application Ser. No. 192,332, filed Sept. 29, 1980, entitled "TWO-LOOP HORIZONTAL AFPC SYSTEM", by R. E. Fernsler and D. H. Willis, now U.S. Pat. No. 4,317,133, both applications herein incorporated by reference.

In phase control loop 55, a phase detector 61 compares the phase of a horizontal retrace pulse voltage 66 developed across a winding, not illustrated, of flyback transformer 24, with the phase of the synchronized horizontal oscillator output signal 81. The output of phase detector 61 is filtered by a filter 62 producing a loop response time about 6 times faster than the response time of PLL 54. The output of filter 62 is a substantially DC control voltage DC2.

The control voltage DC2 will vary with changes in the phase difference between retrace pulse voltage 66 and horizontal oscillator output signal 81. Varying the control voltage DC2 will vary the occurrence of the leading edge of waveform 68 relative to the occurrence of the leading edge of waveform 81. By varying the leading edge of waveform 68, the triggering of one-shot 65 will be varied, thereby varying the phase of the fixed duty cycle switching waveform 69 relative to the phase of the synchronized horizontal oscillator output waveform 81 in a manner maintaining horizontal scanning synchronized with the picture content of the composite video signal.

Under a fault operating condition, it may be desirable to disable horizontal scanning and thus to disable operation of high voltage generator 84. An example of a fault operating condition requiring disablement of high voltage generator 84 is a failure of the switching regulator 22 to maintain a regulated B+ voltage. If the switching regulator fails, the B+ voltage may increase enough to permit excessive ultor voltage generation.

A high voltage protection circuit 73 disables or shuts down operation of horizontal deflection circuit 10, including operation of high voltage generator 84, should an excessive ultor voltage be developed. A retrace pulse voltage 71, developed across a flyback transformer winding 24c, is rectified by a diode 39 and filtered by a capacitor 40 to develop at a terminal 88 a DC voltage representative of the ultor voltage. A current limiting resistor 38 is placed between diode 39 and flyback transformer winding 24c. A voltage divider comprising a resistor 41 and a resistor 42 is placed across capacitor 40.

The emitter input terminal of a comparator transistor 44 is coupled to the junction of resistors 41 and 42. The base input electrode is coupled through a resistor 47 to a source of reference voltage Vref developed at a terminal 89 by a zener diode 50. Bias current for zener diode 50 is obtained from the unregulated input voltage terminal 21 through a resistor 46. A diode 51 is coupled between reference voltage terminal 89 and the emitter input terminal of comparator transistor 44, with the cathode of diode 51 being coupled to the emitter.

Comparator transistor 44 and a complementary conductivity type transistor 45 are coupled together in a latch configuration 43. An output terminal 90 of latch 43, at the collector of transistor 45, is coupled to a junction terminal 80 through a resistor 48. A switching element comprising diodes 78 and 79 are poled so that the like functioning cathode electrodes of the diodes are coupled together at junction terminal 80.

During normal television display operation, diode 51 of high voltage protection circuit 73 is conducting and comparator transistor 44 is cut off, thereby maintaining disabling latch 43 deactivated. If a fault condition occurs during the operation of horizontal deflection circuit 10 and high voltage generator 84, wherein, for example, the ultor voltage tends to increase to unsafe levels, the ultor voltage representative voltage at terminal 88 increases enough to reverse bias diode 51 and forward bias comparator transistor 44 into conduction. A capacitor 49 is coupled across diode 51 to prevent transient voltage at the emitter input electrode of transistor 44 from unnecessarily turning on the transistor. When transistor 44 is turned on, base current is supplied to transistor 45 to turn it on. Disabling latch 43 is activated by the regeneratively maintained conduction of transistors 44 and 45. A filter network comprising a capacitor 52 and a resistor 53 is coupled to the base of transistor 45 to prevent activating latch 43 during transitory picture tube arcing conditions.

When transistor 45 is switched into conduction and disabling latch 43 is activated, a disabling signal is developed at latch output terminal 90, the disabling signal being the ground potential developed at the output terminal when transistor 45 is switched on. With terminal 90 at ground potential, diodes 78 and 79 become forward biased into conducting a latch current $i_L$ out of terminal 80 through a resistor 48. Approximately half of the latch current $i_L$ flows from terminal 82 through diode 78. The other half flows as a DC current through inductor 77 and diode 79, since the DC resistance of inductor 77 is relatively insignificant compared to the resistance of resistor 76.

With diodes 78 and 79 simultaneously conducting, substantially the same voltage, Vcc, is being developed across input terminals 82 and 83 of VCO 59, thereby AC short-circuiting tank network 74. By short circuiting the inductive portion 77 of tank network 74, the alternating input voltage 72 is removed, thereby disabling VCO 59 and removing the VCO alternating output signal 87.

Because VCO output signal 87 serves as the clock input to the divide-by-sixteen counter 60, removal of output signal 87 will result in the signal at output terminal 85 of horizontal oscillator stage 13 being continuously either an upper level signal state or a lower level signal state, depending on the exact instant of latch activation, without any further continuous switching between the two states. With the bilevel, horizontal oscillator output signal 81 disabled, horizontal rate switching signal 69 cannot be developed, thereby disabling the switching action of horizontal output transistor 28 and the development of retrace pulse voltage 70. High voltage generator 84 is therefore also disabled, providing protection against the development of excessive ultor voltage.

A feature of the invention is that the shutdown of the LC oscillator, VCO 59, is insured once the disabling, grounding signal is developed at terminal 90. Since tank network 74 is short-circuited by diodes 78 and 79, spurious excitation of the tank network cannot occur and no alternating voltage can be developed at the output of VCO 59. Furthermore, only a relatively small magnitude latch current $i_L$ is needed to disable tank network 74. The amount of latch current $i_L$ is needed is only that amount required to maintain diodes 78 and 79 forward biased to a degree that will result in terminals 82 and 83 being maintained at substantially the same voltage even if the internal circuitry of VCO 59 should still attempt to excite tank network 74 into oscillation.

The small amount of latch current needed by the inventive arrangement of FIG. 1 to produce, ultimately, the shutdown of high voltage generator 84, may be favorably contrasted to the latch current needed by prior art circuitry that, for example, directs the latch current into the base of driver transistor 33 during a fault operating condition. In such a prior art arrangement, a substantial amount of latch current is required to prevent the horizontal oscillator derived switching signals from switching the horizontal driver transistor into and out of conduction during a fault operating condition.

Similarly disadvantaged are the prior art circuits that use a disabling latch to remove the direct current B+ supply voltage from the horizontal oscillator stage. In such prior art disabling circuits, a relatively large latch current is also required, since activation of the disabling latch must produce a decrease of the supply voltage to a value sufficient to disable horizontal oscillator operation.

VCO 59 of the inventive arrangement may be designed to be fabricated as part of an integrated circuit with input terminals 82 and 83 being connected to terminal pins of the integrated circuit that are bond wire connected to the components fabricated on the integrated circuit substrate. Disabling circuit 73 directly disables the input tank network of the VCO. A bond wire failure of input terminal pin 82 or 83, which disconnects the bond wire from the fabricated components of the integrated circuit, also shuts down VCO 59. Thus, a bond wire failure, which operationally disconnects a protection circuit 73 from the internal circuitry of the VCO, at the same time shuts down the VCO.

Another feature of the invention is the design of a shutdown circuit which, if activated during the on-drive internal, $T_{on}$, of horizontal output transistor 28, permits completion of that interval without prematurely terminating the on-drive to achieve shutdown. Because drive generator 14 includes a one-shot 65 to develop switching voltage 69, neither positive nor negative-going transitions applied to the input of the one-shot, once the shutdown circuit is activated, can reset or retrigger the one-shot during its enable interval when the one-shot is developing its drive pulse voltage portion 69a.

Furthermore, since the stable output state of one-shot 65 is the state in which forward drive for horizontal output transistor 28 is removed, activation of high voltage protection circuit 73 results in horizontal output transistor 28 remaining in or ultimately being switched into the off-state for the duration of shutdown. Activation of the shutdown circuit cannot result in the horizontal output transistor undesirably being in the continuous on-state during shutdown.

FIG. 2 illustrates a portion of the circuit of FIG. 1 including a specific embodiment of the LC voltage controlled oscillator of FIG. 1. Elements of FIGS. 1 and 2 identically labelled function in a similar manner.

In general, VCO 59 is similar to the voltage controlled oscillator described in U.S. Patent Application Ser. No. 012,811, filed Feb. 16, 1979, entitled "VOLTAGE CONTROLLED OSCILLATOR", by A. R. Balaban and S. A. Steckler, now U.S. Pat. No. 4,243,953, herein incorporated by reference.

Coupled across input terminals 82 and 83 of resonant tank network 74 is a differential amplifier arrangement 104 comprising differentially arranged transistors 105 and 106 together with respective buffer transistors 107 and 108. To excite resonant tank network 74 into sustained oscillation to develop alternating voltage 72, positive or regenerative feedback of at least unit gain is provided by coupling the collector of differential transistor 105 to terminal 83. The gain of the feedback loop is determined by such factors as the impedance of tank network 74 and the magnitude of current source 110.

An output terminal of differential amplifier 104, at the collector of differential transistor 106, is coupled to the control electrode of a one-to-one ratio current mirror 119, comprising transistors 102 and 103. The output terminal of VCO 59 is located at the collector of transistor 103. A square-wave VCO output current signal 187, repeating at the tank network resonant frequency of $16f_H$, is applied to the divide-by-sixteen counter 60 of FIG. 1 to develop the horizontal rate, 50% duty cycle, square-wave signal 81.

The quiescent point of differential amplifier 104, assuming a minimal offset voltage, occurs during the AC zero-crossover instants of the sine wave tank voltage 72 when the voltage at terminal 83 relative to ground equals the voltage Vcc. During the positive portion, relative to AC zero, of the sine wave tank voltage 72, the biasing of transistors 105-108 of differential amplifier 104 is such as to maintain differential amplifier 106 in conduction, thereby developing the upper level portion of square-wave current signal 187. During the negative portion of sine wave tank voltage 72, differential transistor 106 is cut off, thereby producing the lower level portion of square-wave current signal 187. Thus, square-wave current signal 187 is in-phase with the sine wave tank output voltage 72.

To control the frequency and phase of the VCO output current signal 187, the resonant frequency of tank network 74 is controlled by a feedback multiplier circuit 112 responsive to the DC control voltage DC1 developed by phase locked loop 54 of FIG. 1. Feedback multiplier 112 may be similar to that described in the aforementioned U.S. Patent Application Ser. No. 012,811, or may be similar to that described in the article, "Applications of a Monolithic Analog Multiplier", by Alberto Bilotti, IEEE JOURNAL OF SOLID-STATE CIRCUITS, Vol. SC-3, No. 4, December 1968, pages 373-380.

Feedback multiplier 112 generates a current $i_0$ in a conductor line 120 that is obtained from the +Vcc supply terminal 82 through tank network 74. The multiplier current $i_0$ is in quadrature with the tank voltage 72. Thus, the multiplier current $i_0$ is in-phase either with the current $i_n$ flowing in tank inductor 77, if the current $i_0$ is a lagging or $-90°$ phased current, or the current $i_0$ is in-phase with the current $i_c$ flowing in tank capacitor 75, if the current $i_0$ is a leading or $+90°$ phased current. In response to the DC control voltage DC1, multiplier 112 varies the magnitude of the quadrature current $i_0$ and establishes the phase of the current as either leading or lagging, thereby varying the apparent capacitance and inductance values of tank network 74 and thereby correspondingly varying the frequency of tank voltage 72.

Buffer transistor 108 of differential amplifier 104 is biased in the linear region of operation. The voltage at the emitter of transistor 108 is therefore a sinusoidal voltage in-phase with the tank output voltage 72. This in-phase voltage, at the emitter of transistor 108, is applied along a signal line 119 to a paraphase amplifier 116 of multiplier 112.

Paraphase amplifier 116 converts the in-phase voltage on signal line 119 into two quadrature signals 180° out-of-phase with each other. The +90° or leading quadrature signal is developed on a signal line 114 and the −90° or lagging signal is developed on a line 115. The two quadrature signals are applied to a double balance cascaded differential amplifier 113 to produce a +90° or leading current $i_1$ in an output conductor line 118 and to produce a −90° lagging current $i_2$ in an output conductor line 117.

The gain of the regenerative feedback loop of the differential amplifier 104 of FIG. 2 is a function of the collector output impedance of transistor 105, with a greater collector output impedance producing a greater gain. The impedance of tank network 74 comprises the collector output impedance. When disabling latch 73 of FIG. 1 is energized, diodes 78 and 79 simultaneously conduct, producing a low impedance shunt across tank network 74. The gain of the regenerative feedback loop after disabling latch 73 is energized thus becomes less than unity, stopping the tank oscillation and shutting down VCO 59.

What is claimed is:

1. A disabling circuit for a television display that includes a high voltage generator to develop a picture tube ultor voltage, comprising:
   an inductive-capacitive resonant network;
   means coupled to said inductive-capacitive resonant circuit for exciting said resonant network into sustained oscillation to develop and alternating output signal;
   a high voltage generator responsive to said alternating output signal for developing a picture tube ultor voltage;
   means for developing a signal representative of said ultor voltage;
   means responsive to said ultor voltage representative signal for developing a disabling signal when said ultor voltage exceeds a predetermined level; and
   a switching element responsive to said disabling signal to a short-circuit said resonant network for stopping said sustained oscillation to disable operation of said high voltage generator.

2. A disabling circuit for a television display that includes a high voltage generator to develop a picture tube ultor voltage, comprising:
   an inductive-capacitive resonant network;
   means coupled to said inductive-capacitive resonant circuit for exciting said resonant network into sustained oscillation to develop an alternating output signal;
   a high voltage generator responsive to said alternating output signal for developing a picture tube ultor voltage;
   means for developing a signal representative of said ultor voltage;
   means responsive to said ultor voltage representative signal for developing a disabling signal when said ultor voltage exceeds a predetermined level; and
   a diode arrangement coupled across the inductive portion of said network and energized only during the development of said disabling signal for stopping said sustained oscillation to disable operation of said high voltage generator.

3. A circuit according to claim 2 wherein said inductive-capacitive network comprises a parallel LC resonant tank circuit.

4. A circuit according to claim 2 wherein said disabling signal developing means comprises a latch coupled to said diode arrangement and activated by said ultor voltage representative signal.

5. A circuit according to claim 4 wherein said diode arrangement comprises first and second diodes having like functioning electrodes coupled together at a junction, an output terminal of said latch being coupled to said junction.

6. A circuit according to claim 5 wherein latch current flows from said first and second diodes to said junction.

7. A circuit according to claims 1, 2 or 5 wherein said high voltage generator comprises means responsive to said alternating output signal for developing a horizontal rate switching signal, a horizontal deflection winding, a trace switch coupled to said deflection winding and responsive to said horizontal rate switching signal for generating scanning current in said deflection winding, means for developing a retrace pulse voltage across said deflection winding when said trace switch becomes cut off, and means responsive to said retrace pulse voltage for developing said ultor voltage.

8. A circuit according to claim 7 wherein said trace switch comprises a horizontal output transistor responsive to said horizontal rate switching signal and a damper diode and wherein said horizontal rate switching signal developing means includes a one-shot pulse generator enabled by said alternating output signal to develop the horizontal output transistor on-drive portion of said horizontal rate switching signal when said one-shot pulse generator is enabled.

9. A disabling circuit for a television display that includes a high voltage generator that develops a picture tube ultor voltage, comprising:
   a reactive resonant network;
   means coupled to said resonant network for regeneratively developing an alternating signal across said resonant network;
   a high voltage generator responsive to said alternating signal for developing a picture tube ultor voltage;
   means for developing a signal representative of abnormal high voltage generator operation;
   means responsive to said abnormal operation representative signal for developing a disabling signal; and
   a switching element coupled to said resonant network and activated by said disabling signal to switch conductive states to generate a substantially direct current in the inductive portion of said resonant network for discontinuing the development of said alternating signal.

10. An LC oscillator shutdown circuit, comprising:
    an LC resonant network;
    means for exciting said resonant network into oscillation to develop a resonant network output voltage, said exciting means including means coupled to said resonant network for forming a regenerative feedback loop, the gain of said feedback loop high enough to sustain oscillation of said resonant network; and means responsive to a shutdown signal for coupling a semiconductor element across said resonant network, the low impedance of said semiconductor element lowering the gain of said feedback loop sufficiently to stop said sustained oscillation.

11. A shutdown circuit according to claim 10 wherein said semiconductor element comprises first and second diodes coupled in series across said resonant network, and wherein said coupling means comprises means for simultaneously forward biasing said first and second diodes into conduction.

12. A shutdown circuit according to claim 11 wherein said resonant network includes an inductor coupled to a source of DC supply voltage and wherein said diode forward biasing means comprises switching means activated by said shutdown signal to generate in said inductor a substantially DC current that is obtained from said DC supply voltage source.

13. A shutdown circuit according to claim 12 wherein said resonant network output voltage is applied to a high voltage generator of a television display to generate an ultor voltage, said shutdown circuit including means responsive to said ultor voltage for developing said shutdown signal when said ultor voltage exceeds a predetermined level.

14. An LC oscillator shutdown circuit comprising:
an LC resonant network;
means for exciting said resonant network into oscillation to develop a resonant network output voltage, said exciting means including a differential amplifier having an output terminal coupled to said resonant network and means for applying said resonant network output voltage to an input terminal of said differential amplifier for forming a regenerative feedback loop, the gain of said feedback loop high enough to sustain oscillation of said resonant network; and
means responsive to a shutdown signal for coupling a semiconductor element across said resonant network, the low impedance of said semiconductor element lowering the gain of said feedback loop sufficiently to stop said sustained oscillation.

15. A television receiver horizontal deflection shutdown circuit permitting completion of the forward biasing interval of the horizontal output transistor if said protection circuit is first activated within said interval due to abnormal deflection circuit operation, comprising:
a horizontal deflection winding;
a trace switch coupled to said horizontal deflection winding, said trace switch including a horizontal output transistor;

a horizontal oscillator for developing a horizontal rate bilevel signal;
a one-shot responsive to only one of the positive and negative-going transitions of said bilevel signal for developing during each cycle of said bilevel signal a drive pulse voltage having a pulse duration that is independent of the recurrence of said one transition within said drive pulse voltage interval;
means for applying said drive pulse voltage to the base of said horizontal output transistor to forward bias said horizontal output transistor for the duration of said drive pulse voltage, a reverse biasing voltage for said horizontal output transistor being developed during normal deflection circuit operation in the absence of said drive pulse voltage, wherein the switching action of said horizontal output transistor produces horizontal scanning current; and
shutdown means coupled to said horizontal oscillator and activated by abnormal deflection circuit operation for removing said bilevel signal to maintain said horizontal output transistor in a cut off state without prematurely terminating said drive pulse voltage when said shutdown means is activated prior to completion of said drive pulse voltage interval.

16. A shutdown circuit according to claim 15 wherein said horizontal oscillator comprises an inductive-capacitive resonant network, means for regeneratively exciting said network into oscillation and means for developing said horizontal rate bilevel signal in response to oscillations of said network and wherein said shutdown means includes means for short-circuiting said resonant network to stop said oscillation.

17. A shutdown circuit according to claim 16 wherein said short-circuiting means comprises first and second diodes coupled in series across the inductive portion of said resonant network and means for forward biasing said two diodes upon activation of said shutdown means.

18. A shutdown circuit according to claim 17 wherein said forward biasing means comprises a latch activated by said abnormal deflection circuit operation and having an output terminal coupled to a junction terminal of said first and second diodes, latch current flowing from said two diodes into said junction terminal.

19. A shutdown circuit according to claim 18 including a resonant retrace circuit coupled to said horizontal deflection winding for generating a retrace pulse voltage in response to the switching action of said horizontal output transistor during normal deflection circuit operation and including means responsive to said retrace pulse voltage for developing an ultor voltage.

* * * * *

UNITED STATES PATENT AND TRADEMARK OFFICE
CERTIFICATE OF CORRECTION

PATENT NO. : 4,389,676

DATED : June 21, 1983

INVENTOR(S) : ALVIN R. BALABAN, ET AL

It is certified that error appears in the above-identified patent and that said Letters Patent is hereby corrected as shown below:

Column 6, Line 19

That portion reading "4,282,529" should read -- 4,282,549 --

Signed and Sealed this

Fourth Day of October 1983

[SEAL]

Attest:

GERALD J. MOSSINGHOFF

Attesting Officer

Commissioner of Patents and Trademarks